(12) United States Patent
Welnick et al.

(10) Patent No.: US 7,489,913 B2
(45) Date of Patent: Feb. 10, 2009

(54) METHOD FOR CONTROLLING DIVERSITY RECEIVERS IN A WIRELESS COMMUNICATION DEVICE

(75) Inventors: William E. Welnick, Poway, CA (US); William P. Alberth, Jr., Crystal Lake, IL (US); Robert T. Love, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 610 days.

(21) Appl. No.: 11/028,870

(22) Filed: Jan. 4, 2005

(65) Prior Publication Data

US 2006/0148433 A1 Jul. 6, 2006

(51) Int. Cl.
*H04B 1/18* (2006.01)

(52) U.S. Cl. ............ 455/140; 455/135; 455/226.1

(58) Field of Classification Search ............ 455/132, 455/133, 134, 135, 136, 137, 140, 161.2–161.3, 455/436–444, 179.1, 186.1, 226.1, 226.3, 455/277.1, 277.2, 334
See application file for complete search history.

(56) References Cited

U.S. PATENT DOCUMENTS

| | | | | | |
|---|---|---|---|---|---|
| 4,704,734 | A | * | 11/1987 | Menich et al. | 455/440 |
| 4,726,050 | A | * | 2/1988 | Menich et al. | 455/425 |
| 5,109,390 | A | * | 4/1992 | Gilhousen et al. | 370/335 |
| 5,303,400 | A | * | 4/1994 | Mogi | 455/186.1 |
| 5,345,602 | A | * | 9/1994 | Wiedemann et al. | 455/137 |
| 5,640,414 | A | * | 6/1997 | Blakeney et al. | 375/130 |
| 5,710,995 | A | * | 1/1998 | Akaiwa et al. | 455/277.2 |
| 5,740,526 | A | * | 4/1998 | Bonta et al. | 455/277.2 |
| 6,141,536 | A | * | 10/2000 | Cvetkovic et al. | 455/45 |
| 6,529,746 | B1 | * | 3/2003 | Kotzin | 455/562.1 |
| 6,577,353 | B1 | * | 6/2003 | Welles et al. | 348/706 |
| 6,628,930 | B1 | * | 9/2003 | Vogt et al. | 455/131 |
| 6,678,508 | B1 | * | 1/2004 | Koilpillai et al. | 455/137 |
| 6,836,660 | B1 | * | 12/2004 | Wala | 455/434 |
| 6,957,068 | B2 | * | 10/2005 | Hutchison et al. | 455/435.2 |
| 7,116,959 | B1 | * | 10/2006 | Link et al. | 455/277.1 |
| 7,254,378 | B2 | * | 8/2007 | Benz et al. | 455/277.1 |
| 2002/0183086 | A1 | * | 12/2002 | Hellmark et al. | 455/522 |
| 2002/0197992 | A1 | * | 12/2002 | Nizri et al. | 455/435 |
| 2003/0003910 | A1 | | 1/2003 | Mc Clure | |
| 2004/0253955 | A1 | | 12/2004 | Love et al. | |
| 2005/0192009 | A1 | * | 9/2005 | Shaheen et al. | 455/436 |

* cited by examiner

*Primary Examiner*—Blane J Jackson
(74) *Attorney, Agent, or Firm*—Sylvia Chen

(57) ABSTRACT

A method for controlling diversity receivers in a wireless communication device includes the steps of: determining if the wireless communication device is experiencing poor coverage (220), using a first receiver and a second receiver for diversity (230) if the wireless communication device is experiencing poor coverage, and using the second receiver for scanning (240) if the wireless communication device is not experiencing poor coverage. Thus, diversity can be used when needed to improve reception. Both receivers, however, can be used in a non-diversity mode to reduce current drain or to speed up channel acquisition when coverage is not poor.

19 Claims, 8 Drawing Sheets

METHOD FOR CONTROLLING DIVERSITY RECEIVERS IN A WIRELESS COMMUNICATION DEVICE

FIELD OF THE DISCLOSURE

This disclosure relates generally to a terminal device having diversity receivers.

BACKGROUND OF THE DISCLOSURE

Wireless communication devices encounter situations where reception is good and also situations where reception is poor. In certain circumstances, diversity reception could improve reception. In other circumstances, diversity reception would not improve reception and instead would only lead to increased power drain due to the operation of more than one receiver. Thus, there is an opportunity to use diversity receivers to improve reception at a wireless communication device yet reduce the times of increased power drain caused by operating multiple receivers for diversity. The various aspects, features and advantages of the disclosure will become more fully apparent to those having ordinary skill in the art upon careful consideration of the following Drawings and accompanying Detailed Description.

DETAILED DESCRIPTION OF THE PREFERRED EMBODIMENTS

A method for controlling diversity receivers in a wireless communication device includes the steps of: determining if the wireless communication device is experiencing poor coverage (220), using a first receiver and a second receiver for diversity (230) if the wireless communication device is experiencing poor coverage, and using the second receiver for scanning (240) if the wireless communication device is not experiencing poor coverage. Thus, diversity can be used when needed to improve reception. Both receivers, however, can be used in a non-diversity mode to reduce current drain or to speed up channel acquisition when coverage is not poor.

Poor coverage can be determined by collecting statistics using two receivers and collecting statistics using one receiver. If coverage statistics using two receivers is better than coverage statistics using one receiver, than the terminal device concludes that coverage is poor.

This method can be tailored to traffic mode situations, traffic mode with data session situations, idle mode situations, idle mode camped situations, and foreground scanning mode situations.

Figure 1:
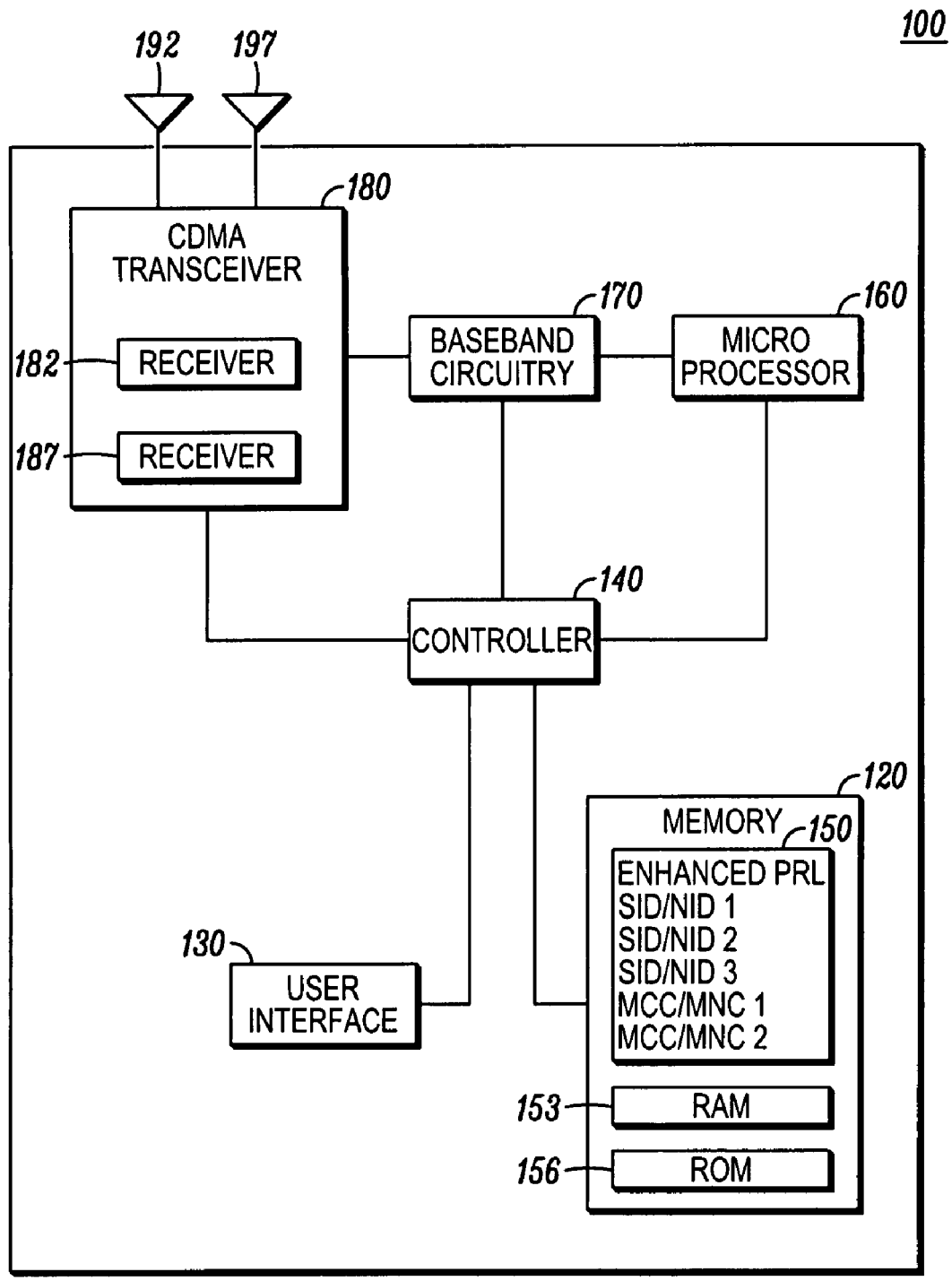
FIG. 1 shows a block diagram of a terminal device having diversity receivers for use with the embodiments shown in FIGS. 2-8.

FIG. 1 shows a block diagram of a terminal device 100 having a diversity receiver according to the embodiments. Diversity receivers have at least a first receiver with a first antenna and a second receiver with a second antenna. The antennas of a diversity receiver are decorrelated. The terminal device 100 in the embodiments is a CDMA cellular telephone. Alternate terminal devices, such as cellular modems, personal digital assistants (PDAs) with wireless interfaces, pagers, and other devices can be substituted for the cellular telephone shown. Additionally, other radio access technologies such as GSM, GPRS, UMTS, multi-band and/or multi-mode can be substituted for CDMA in the terminal device 100. The terminal device 100 includes a first CDMA transceiver 180 with a first CDMA receiver 182 and first antenna 192, a second CDMA receiver 187 and second antenna 197, baseband circuitry 170, a microprocessor 160, a controller 140, and a user interface 130 that includes components such as a keypad, a display, a loudspeaker, and a microphone.

Additionally, memory block 120 stores an enhanced preferred roaming list (PRL) 150. The enhanced PRL 150 includes at least one mobile country code (MCC) with or without an optional Mobile Network Code (MNC or IMSI_11_12). The enhanced PRL 150 may also include a system identifier (SID) with or without an optional network identifier (SID). These codes are referred to as MCC/MNCs and SID/NIDs. The memory block can be implemented as a memory that is not intended to be removed from the terminal device 100, as a User Interface Module (UIM), as a Removable User Interface Module (RUIM), or as another type of memory unit. Other memory in the memory block 120 can include random access memory (RAM) 153 and read-only memory (ROM) 156.

Figure 2:
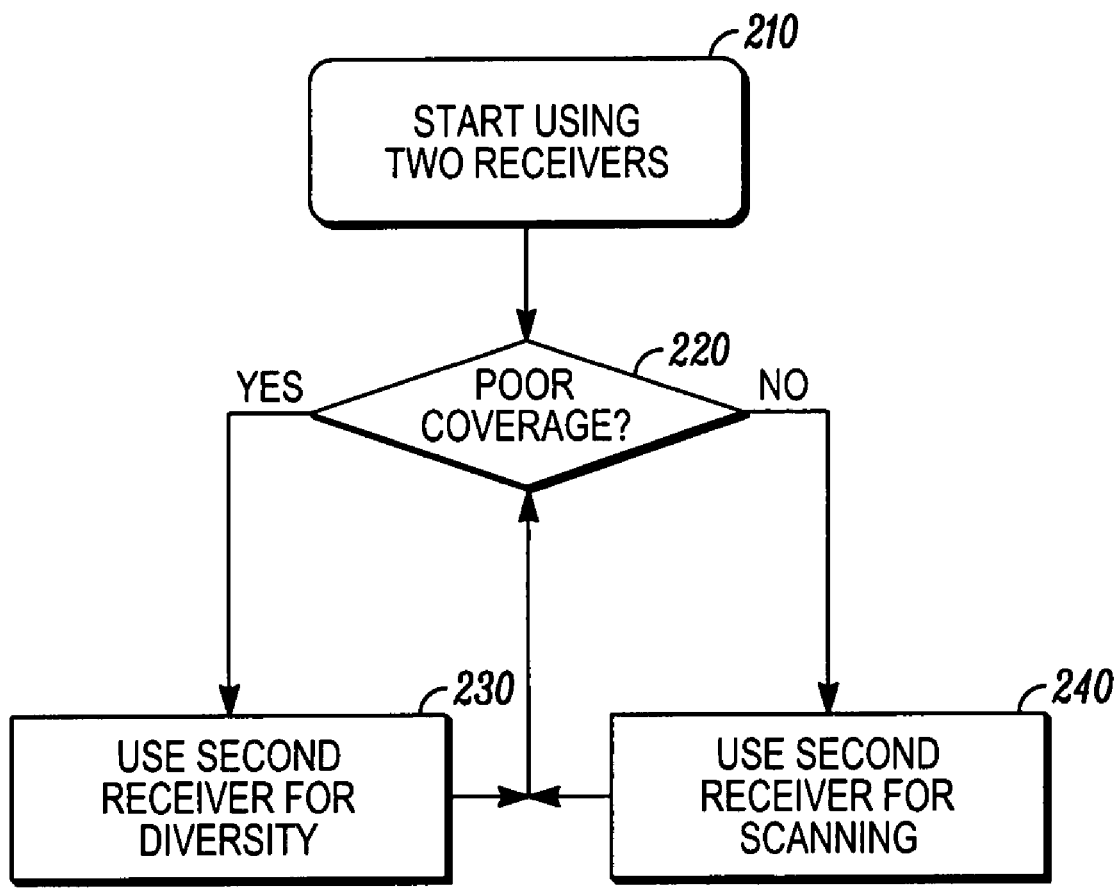
FIG. 2 shows a flowchart for using the terminal device of FIG. 1 according to a first embodiment.

FIG. 2 shows a flowchart 200 for using the terminal device 100 of FIG. 1 according to a first embodiment. This flowchart 200 can be implemented using software in the microprocessor 160 of the terminal device 100 shown in FIG. 1. This embodiment shows two CDMA receivers, however, these teachings can be expanded to use more than two receivers as well as reception technology other than CDMA.

The flowchart 200 starts in step 210 when the terminal device 100 starts using two receivers. Step 220 determines if the terminal device 100 is experiencing poor coverage. The poor coverage determination step 220 will be expanded with respect to FIG. 3. If the terminal device 100 is experiencing poor coverage, step 230 uses a second receiver (such as receiver 187 of FIG. 1) for diversity. Of course, a first receiver (such as receiver 182 of FIG. 1) is also needed for diversity reception. If the terminal device 100 is not experiencing poor coverage, step 240 uses a second receiver (such as receiver 187 of FIG. 1) for either foreground or background scanning, depending on the mode of the terminal device 100. Note that the second receiver mentioned in this flowchart is simply any receiver other than the first receiver. Thus, if the terminal device is in good coverage, both receivers will independently scan channels to find service, getting through the list as quickly as possible. If the terminal device is in poor coverage, then the second receiver is used for diversity to maximize the ability of the terminal device to pull in marginal signals.

Periodically, step 230 and step 240 return to step 220 to re-evaluate the coverage situation of the terminal device 100. Because the terminal device 100 may be changing geographic locations, the network may be experiencing different loading conditions, and/or the environment of the terminal device may be variable, periodic coverage re-determination allows the flowchart 200 to deploy a second receiver more efficiently for either diversity reception to improve coverage or for scanning to reduce current drain. Note that the periodicity of the coverage re-determination can vary depending on, for example, a trigger (e.g., in step 240 the second receiver has completed scanning of a predetermined number of channels), an elapsed time period that can depend on what mode the terminal device 100 is in (e.g., idle mode or traffic mode), or the "poorness" of the coverage.

Figure 3:
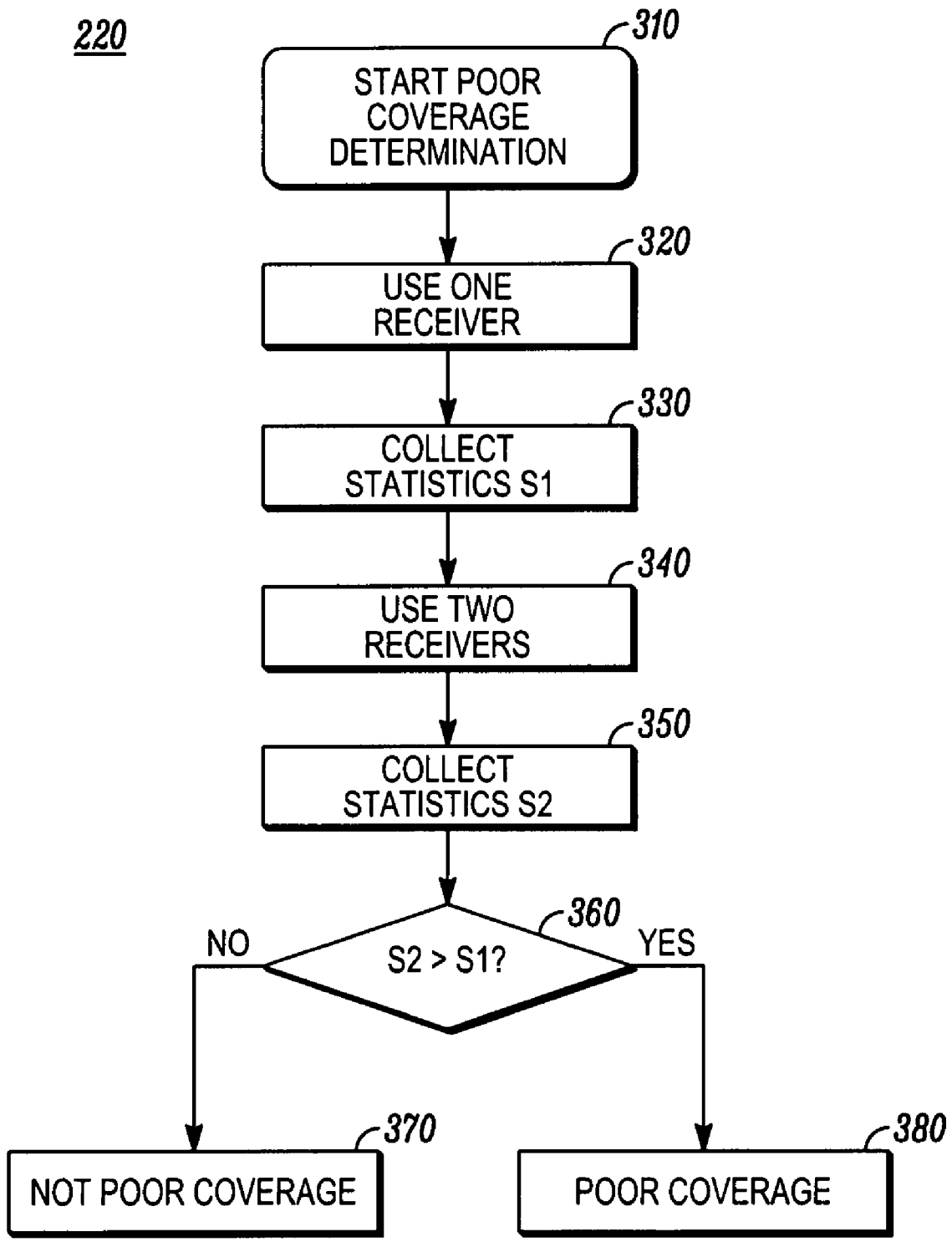
FIG. 3 shows a flowchart for determining poor coverage according to the first embodiment.

FIG. 3 shows a flowchart 220 for determining poor coverage according to the first embodiment. Step 310 starts the poor coverage determination. Step 320 uses one receiver (such as the first receiver 182 shown in FIG. 1), and step 330 collects statistics S1 using the one receiver over a first predetermined time period T1. Depending on the implementation, the statistics S1 can be packet erasure rate, frame erasure rate, bit error rate, the average power of a carrier channel over total signal power ($E_C/I_O$), energy per bit over noise ($E_B/N_O$), received signal strength indication (RSSI), other statistics, the rate of change of one or more of the statistics, or a combination of statistics.

After statistics S1 are collected, step 340 uses two receivers (such as the first receiver 182 and second receiver 187 shown in FIG. 1) and step 350 collects statistics S2 using both receivers over a second predetermined time period T2. The statistics S2 should be the same type of statistics as statistics S1 so that they can be compared. The second predetermined time period T2 can be equal to or different from the first predetermined time period T1.

Step 360 compares the two statistics S1 and S2. If Statistics S2 is significantly larger than statistics S1, step 380 determines that the terminal device 100 is experiencing poor coverage. If Statistics S2 is not significantly larger than statistics S1, step 370 determines that the terminal device 100 is not experiencing poor coverage. The determination of "significantly larger" can be implemented using absolute numbers (e.g., S1 is less than a predetermined value and S2 is greater than a predetermined value), arithmetic ratios (e.g., S2 is more than three times S1), logarithmic ratios, or other comparisons depending on the type of statistics collected as well as the sensitivity and power efficiency of the multiple receivers.

Figure 4:
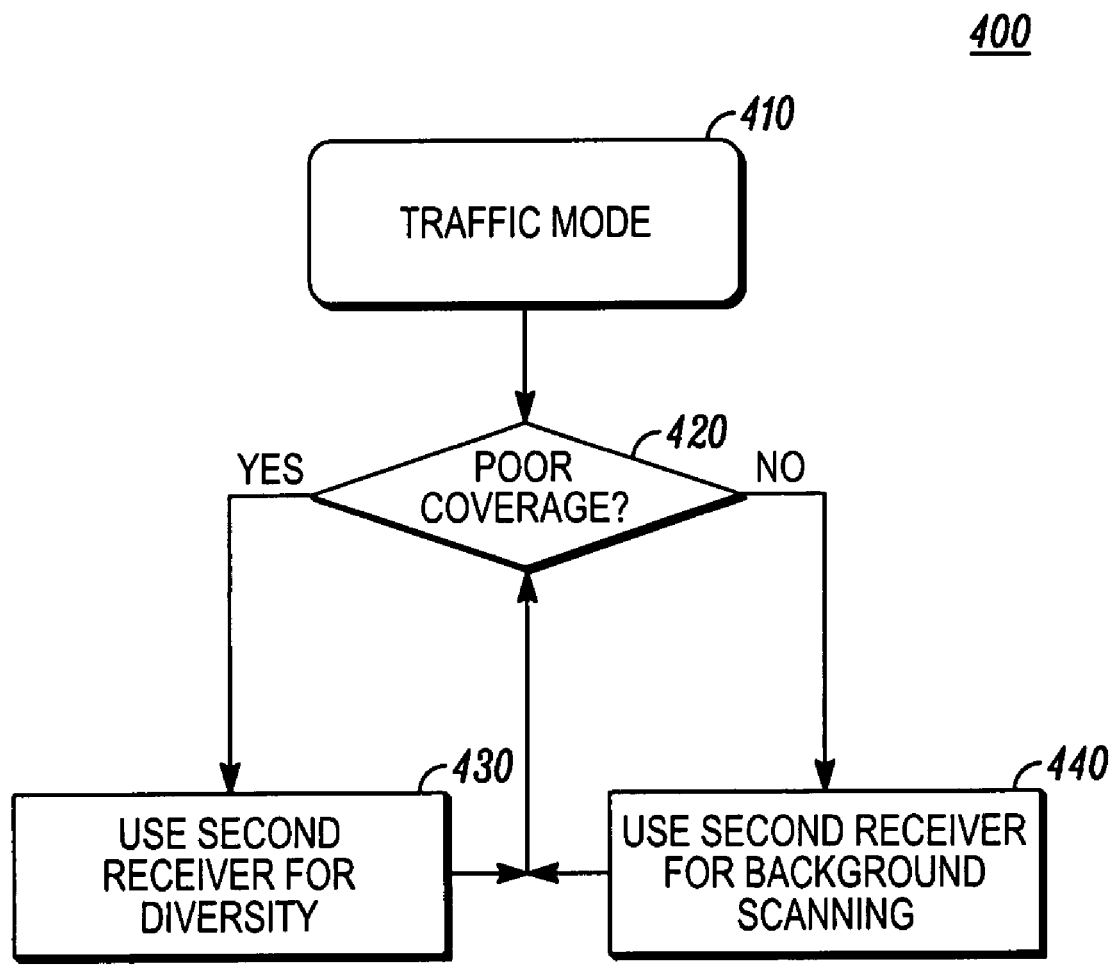
FIG. 4 shows a flowchart for using the terminal device of FIG. 1 according to a second embodiment.

FIG. 4 shows a flowchart 400 for using the terminal device 100 of FIG. 1 according to a second embodiment. In this second embodiment, the first embodiment shown in FIG. 2 is tailored to a terminal device 100 in traffic mode. During traffic mode, a first receiver (such as receiver 182 in FIG. 1) is in a call and is tuned to a specific traffic channel and is receiving or expecting to receive signals. Step 410 has the terminal device in traffic mode with a first receiver tuned to a traffic channel. Step 420 determines if the terminal device 100 is experiencing poor coverage. Step 420 can be implemented using the flow chart 300 shown in FIG. 3. If the terminal device 100 is experiencing poor coverage, step 430 uses a second receiver (such as receiver 187 shown in FIG. 1) for diversity reception on the traffic channel. Of course, the first receiver is also used for diversity. If the terminal device 100 is not experiencing poor coverage, step 440 uses a second receiver for background scanning while the first receiver is tuned to the traffic channel. If background scanning is not necessary the second receiver may be powered down to save current.

Step 430 and step 440 flow back to step 420 periodically to re-determine the coverage situation. As the unit moves and signal conditions change, it will be necessary to periodically check if the coverage status has changed. The coverage check may occur on a timer or may be triggered by a change in a signal statistic measured on the active receiver(s) such RSSI, Frame error rate, or other suitable indication of signal quality. Note that the relational terms "first" and "second" are used merely to distinguish one receiver from the other. Depending on the situation, a "first receiver" could be the receiver 187 shown in FIG. 1 rather than the receiver 182 shown in FIG. 1.

Figure 5:
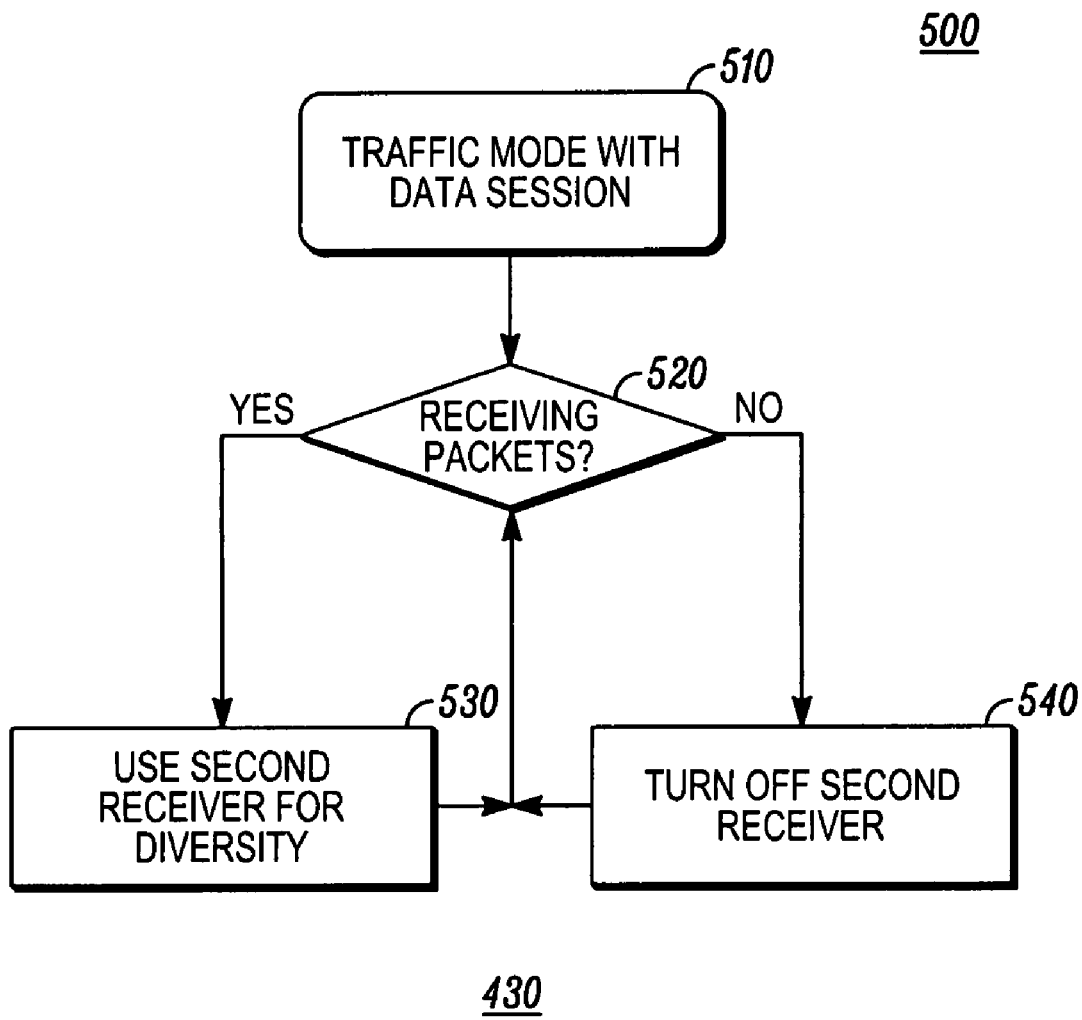
FIG. 5 shows a flowchart for using the terminal device of FIG. 1 according to a third embodiment.

FIG. 5 shows a flowchart 500 for using the terminal device 100 of FIG. 1 according to a third embodiment. This third embodiment is a further variation of the second embodiment and where the terminal device 100 is not only in traffic mode but is also in a data session. This third embodiment can be incorporated as a particular implementation of step 430 shown in FIG. 4.

When a terminal device 100 is in a data session as shown in step 510, the terminal device 100 is transmitting and receiving data packets. If step 520 determines that the terminal device 100 is receiving packets, step 530 uses a second receiver (along with a first receiver) for diversity reception of the data packets. This is to reduce packet error rate, reducing the need for packet re-transmissions and improving the overall network.

If step 520 determines that the terminal device 100 is not receiving packets, step 540 turns off the second receiver. The first receiver can be used for background scanning between packet receptions. Current drain is reduced by temporarily turning off a second receiver (such as receiver 187 in FIG. 1) when the terminal device 100 is not receiving packets during a data session. This does not affect the quality of the data reception, because the first receiver (such as receiver 182 in FIG. 1) is available to monitor the traffic channel. Step 530 and step 540 flow back to step 520 periodically depending on a timer or a statistic of the receive channel such as RSSI, packet error rate, etc. The signal conditions change constantly as the terminal device moves in the network. Periodically re-evaluating in step 520 allows the unit to dynamically change with the network and signal conditions.

Figure 6:
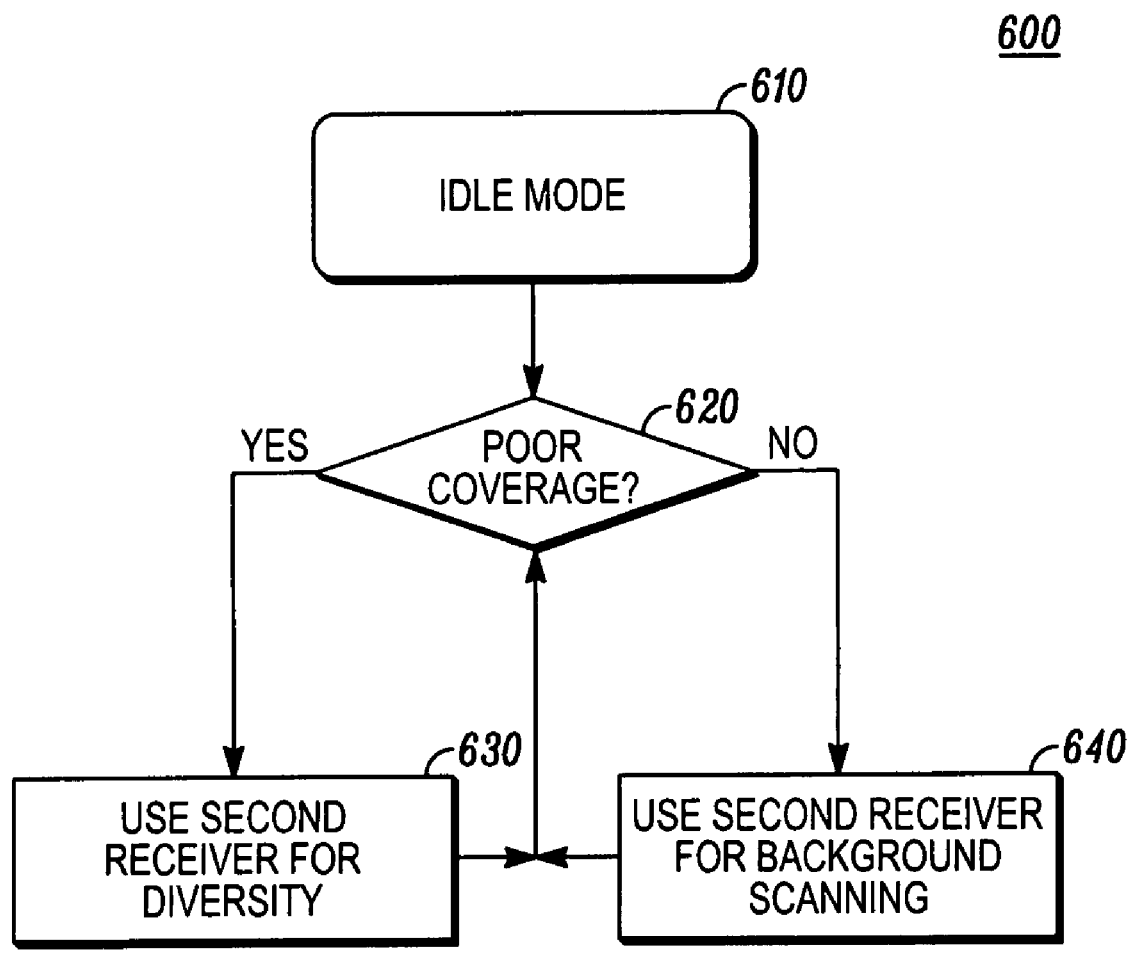
FIG. 6 shows a flowchart for using the terminal device of FIG. 1 according to a fourth embodiment.

FIG. 6 shows a flowchart 600 for using the terminal device 100 of FIG. 1 according to a fourth embodiment. In this fourth embodiment, the first embodiment shown in FIG. 2 is tailored to a terminal device 100 in idle mode. During idle mode, the terminal device 100 is not in a call but is monitoring various control channels of a system. Step 610 has the terminal device in idle mode with a first receiver (such as receiver 182 in FIG. 1) monitoring control channels of a system. Step 620 determines if the terminal device 100 is experiencing poor coverage. Step 620 can be implemented using the flow chart 300 shown in FIG. 3. If the terminal device 100 is experiencing poor coverage, step 630 uses a second receiver (such as receiver 187 in FIG. 1) for diversity reception. Of course, the first receiver is also used for diversity. If the terminal device 100 is not experiencing poor coverage, step 640 uses the second receiver for background scanning. Meanwhile, the first receiver continues to monitor the appropriate control channels.

Step 630 and step 640 flow back to step 620 periodically to re-determine the coverage situation. Returning to step 620 may be caused by changes in channel statistics (such as RSSI), paging message errors, or a timer.

Figure 7:
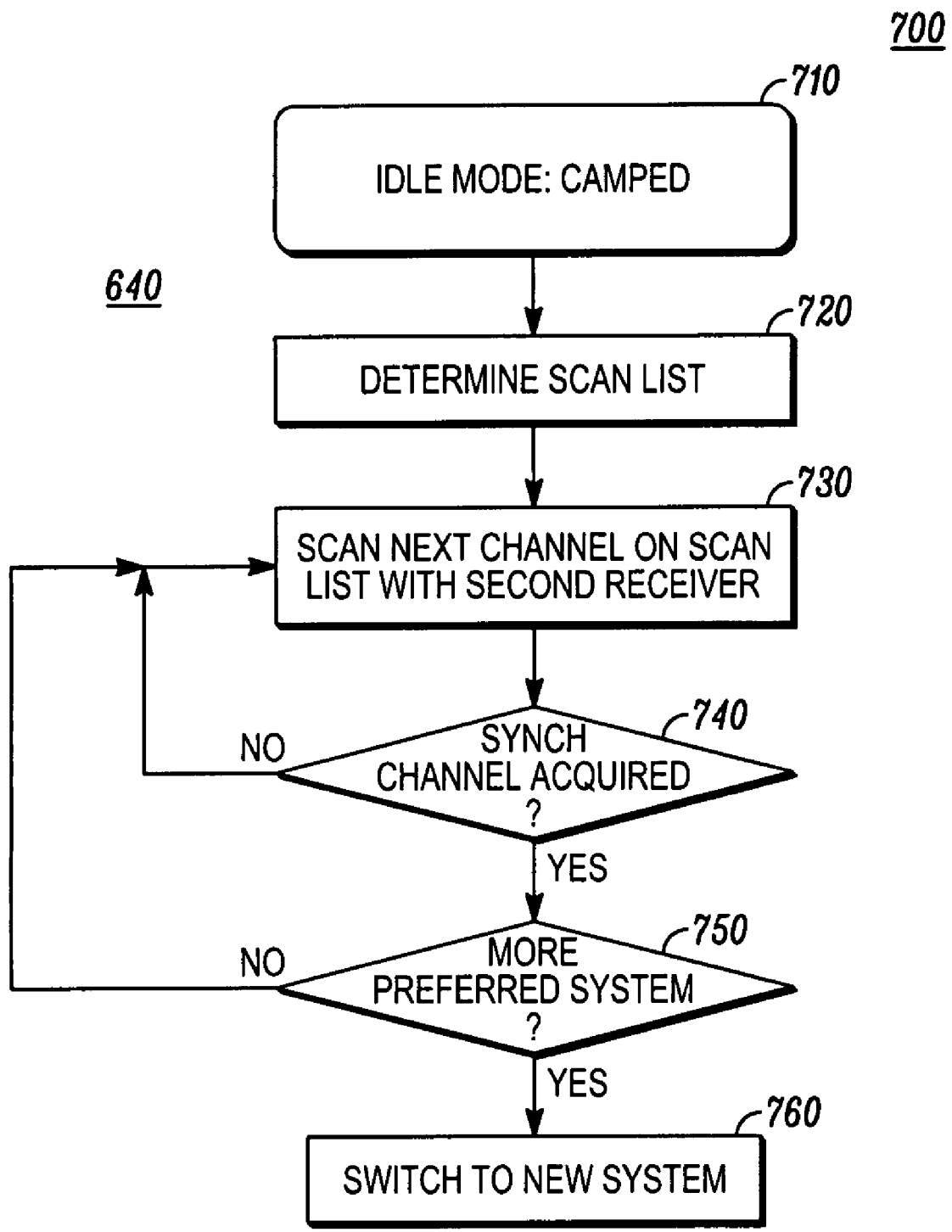
FIG. 7 shows a flowchart for using the terminal device of FIG. 1 according to a fifth embodiment.

FIG. 7 shows a flowchart 700 for using the terminal device of FIG. 1 according to a fifth embodiment. This fifth embodiment is a further variation of the fourth embodiment where the terminal device 100 is not only in idle mode but a first receiver (such as receiver 182) of the terminal device 100 is camped on a system. This fifth embodiment can be incorporated as a particular implementation of step 640 shown in FIG. 6. In this situation, the first receiver remains camped on the system and a second receiver is used to background scan for a more preferred system.

Step 710 starts with the first receiver (such as receiver 182 in FIG. 1) in idle mode and camped on a system in good coverage. Step 720 determines a scan list. The list can be neighbor list, a list of possible systems from the preferred roaming list (PRL), another list provided by the network, or a list determined from memory.

In step 730, the second receiver sequentially scans through the list. The scans occur while the first receiver is active—allowing the unit to conserve battery power by powering both receivers up at the same time. Ideally, the second receiver would be off whenever the first receiver is off. This also allows all the baseband circuitry to only be active for a short time duration to support both receivers, then sleep and wait for the next time the first receiver is scheduled to receive information on the idle channel.

Step 740 determines if a channel has been acquired. If no channel has been acquired, then the second receiver scans the next channel on the scan list. If a channel has been acquired, step 750 has the terminal device determine if the channel acquired in step 740 is more preferred then the channel presently camped on. If so, step 760 camps on the more preferred system Note, at this point the former "first receiver" would now be considered the "second receiver" for purposes of background scanning in step 440 of FIG. 4. The relational terms "first" and "second" are used merely to distinguish one receiver from the other and are not static designations.

Figure 8:
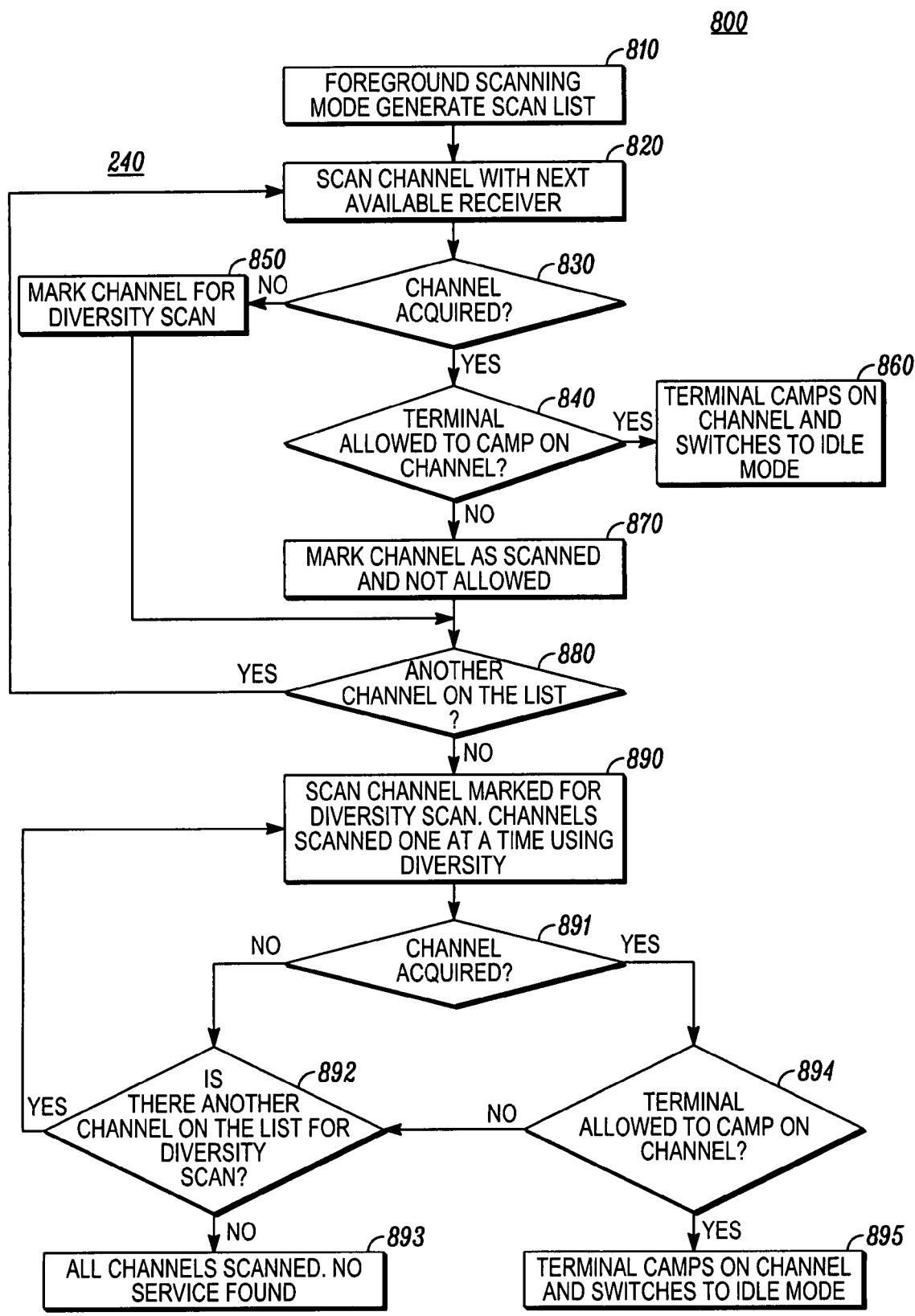
FIG. 8 shows a flowchart for using the terminal device of FIG. 1 according to a sixth embodiment.

FIG. 8 shows a flowchart for using the terminal device of FIG. 1 according to a sixth embodiment. In this sixth embodiment, the first embodiment shown in FIG. 2 is tailored to a terminal device 100 in foreground scanning mode. During foreground scanning mode, a terminal device 100 sequentially scans channels listed on a scan list with a goal of acquiring a system that is listed on an Enhanced PRL. It may take several second to acquire a system when a terminal device has an Enhanced PRL, due to the fact that acquiring an MCC/MNC from a paging channel may take up to two seconds. First, a receiver needs to acquire a SYNCH channel, and then the receiver needs to acquire the related paging channel. If the MCC/MNC from the paging channel is listed on the Enhanced PRL, then the system is readily available to the terminal device. Thus, a terminal device may camp on the first system it can acquire even if it is not the most preferred system available.

In this mode, none of the receivers 182, 187 of the terminal device 100 are in either idle mode or traffic mode. Generally, foreground scanning mode occurs when the terminal device 100 is powered on or the terminal device 100 has encountered a situation where no signals can be located and thus cannot camp on a system in idle mode. Thus, step 240 of FIG. 2 can implement the flowchart 800 shown in FIG. 8.

Step 810 has the terminal device entering foreground scanning mode. This typically occurs when the unit is powered on and needs to find service. In step 810, the terminal device generates a scan list for finding service.

In step 820, the terminal device scans a first channel on the list with one of the receivers. If a channel is acquired, as determined by step 830, the terminal device in step 840 will determine if it is allowed to camp on the channel. If the terminal device is allowed to camp on the recently acquired channel, then step 860 switches the terminal device to idle mode and foreground scanning ends. If step 840 determines that the terminal device is not allowed to camp on the newly acquired channel, then the flow continues to step 870, and the terminal device marks the channel as scanned and not allowed. In step 880, the terminal device determines if other channels remain to be scanned on the list.

If step 830 determines that the scanned channel cannot be acquired, then step 850 marks the channel as a diversity scanning candidate, and the terminal device will go to step 880. If channels remain to be scanned, then the flow returns to step 820. At this time, whichever receiver is free will scan the next channel on the list. Thus the terminal device will have both receivers independently scanning channels from the scan list searching for a system to camp on.

Once all the channels on the scan list have been scanned using a single receiver at a time, then flow continues to step 890, and the terminal device will use diversity to scan any diversity channel candidates marked at step 850. While not shown, it should be noted that if there are no diversity channel candidates, the flow will jump to step 893. If at least one channel was marked for diversity scanning, then step 890 will use both receivers to scan a channel from the diversity candidate list. Step 891 determines if a channel was acquired. If a channel is not acquired, the flow continues to step 892 to determine if another diversity candidate channel is available. If another diversity candidate channel exists, the flow continues to step 890 and the next diversity candidate channel on the list is scanned.

If a channel is acquired at step 891, then the terminal device determines if it may camp on the channel in step 894. If the terminal device can camp on that channel, then flow continues to step 895, where the terminal device camps on the channel and switches to idle mode. If the terminal device is not allowed to camp on the channel, then flow goes to step 892.

At step 893, all channels have been scanned with a single receiver or diversity and no service has been found. At this point, depending on the rules governing system selection of the terminal device, the unit may build a new scan list and start the process over from step 810 or it may wait for a period of time before re-attempting to find service.

Thus, the terminal device will use two receivers independently to scan a list to find service as quickly as possible, and then re-scan channels that were not originally found using diversity to maximize the ability to receive a signal. Other methods of interleaving simplex and diversity scanning can be used.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

We claim:

1. A method for controlling diversity receivers in a wireless communication device comprising the steps of:
   determining if the wireless communication device is experiencing poor coverage, wherein the determining comprises
      operating a first receiver and collecting coverage statistics S1,
      operating the first receiver and a second receiver and collecting coverage statistics S2,
      determining that the wireless communication device is experiencing poor coverage if coverage statistics S2 is greater than coverage statistics S1, and
      determining that the wireless communication device is not experiencing poor coverage if coverage statistics S2 is not greater than coverage statistics S1;
   using the first receiver and the second receiver for diversity, if the wireless communication device is experiencing poor coverage; and
   using the second receiver for scanning, if the wireless communication device is not experiencing poor coverage.

2. A method according to claim 1 further comprising the step of:
   returning to the step of determining if the wireless communication device is experiencing poor coverage.

3. A method according to claim 1 wherein the wireless communication device is in a traffic mode and the step of using the second receiver for scanning comprises:
   using the second receiver for background scanning.

4. A method according to claim 1 wherein the wireless communication device is in a traffic mode and the step of using the first receiver and the second receiver for diversity further comprises the steps of:
   determining if the wireless communication device is receiving data packets;
   using the first receiver and the second receiver for diversity, if the wireless communication device is receiving data packets; and
   turning off the second receiver, if the wireless communication device is not receiving data packets.

5. A method according to claim 4 further comprising the step of:
   returning to the step of determining if the wireless communication device is receiving data packets.

6. A method according to claim 1 wherein the wireless communication device is in an idle mode and the step of using the second receiver for scanning comprises:
   using the second receiver for background scanning.

7. A method according to claim 6 wherein the second receiver is turned off when background scanning is not being performed.

8. A method according to claim 6 wherein the first receiver is camped on a current system and the step of using the second receiver for background scanning comprises:
   scanning a next channel on a scan list with the second receiver;
   acquiring a channel;
   determining if the channel belongs to a more preferred system than the current system; and
   switching to the more preferred system.

9. A method according to claim 8 further comprising the steps of:
   returning to the step of scanning a next channel on a scan list with the second receiver, if the step of acquiring a channel is not successful.

10. A method according to claim 8 further comprising the steps of:
    returning to the step of scanning a next channel on a scan list with the second receiver, if the channel does not belong to a more preferred system than the current system.

11. A method according to claim 1 wherein the wireless communication device is in a foreground scanning mode and the step of using the second receiver for scanning comprises the steps of:
    scanning a next channel on a scan list with an available receiver;
    acquiring a channel;
    determining if the channel belongs to a system listed on a preferred roaming list of the wireless communication device; and
    camping on the system, if it is listed on the preferred roaming list.

12. A method according to claim 11 wherein the step of determining if the channel belongs to a system listed on a preferred roaming list of the wireless communication device comprises:
    obtaining a system identifier from the channel; and
    determining if the system identifier is listed in the preferred roaming list.

13. A method according to claim 12 wherein the step of determining if the channel belongs to a system listed on a preferred roaming list of the wireless communication device comprises:
    acquiring a second channel related to the channel;
    obtaining a mobile country code identifier from the second channel; and
    determining if the mobile country code identifier is listed in an enhanced preferred roaming list of the wireless communication device.

14. A method for controlling diversity receivers in a device comprising the steps of:
    scanning a list of channels using a first receiver and a second receiver separately;
    marking a channel as a diversity candidate channel; and
    using the first receiver and the second receiver for diversity to scan the diversity candidate channel.

15. The method according to claim 14 further comprising the steps of:
    determining if the device is experiencing poor coverage; and
    using the first receiver and the second receiver for diversity, if the device is experiencing poor coverage.

16. The method according to claim 14, wherein scanning a list of channels using a first receiver and a second receiver separately comprises:
    scanning a first channel in the list of channels with an available one of the first receiver and the second receiver;
    acquiring the first channel;
    determining if the device is allowed to camp on the first channel;

camping on the first channel if the device is allowed to camp on the first channel;

marking the first channel as scanned and not allowed if the device is not allowed to camp on the first channel; and scanning a next channel in the list of channels.

17. The method according to claim 14, wherein marking a channel as a diversity candidate channel comprises:

determining that a first channel in the list of channels is not acquired; and marking the first channel as the diversity candidate channel.

18. The method according to claim 14, wherein using the first receiver and the second receiver for diversity to scan the diversity candidate channel further comprises:

determining that the diversity candidate channel is acquired; and camping on the diversity candidate channel when the device is allowed to camp on the diversity candidate channel.

19. A method for controlling diversity receivers in a wireless communication device comprising the steps of:

determining if the wireless communication device is experiencing poor coverage;

using a first receiver and a second receiver for diversity, if the wireless communication device is experiencing poor coverage, wherein the wireless communication device is in a traffic mode and the step of using the first receiver and the second receiver for diversity further comprises determining if the wireless communication device is receiving data packets, using the first receiver and the second receiver for diversity, if the wireless communication device is receiving data packets, and turning off the second receiver, if the wireless communication device is not receiving data packets; and using the second receiver for scanning, if the wireless communication device is not experiencing poor coverage.

* * * * *